Oct. 4, 1932.  T. W. SUKUMLYN  1,880,289
LIGHT SENSITIVE DEVICE
Filed July 21, 1928
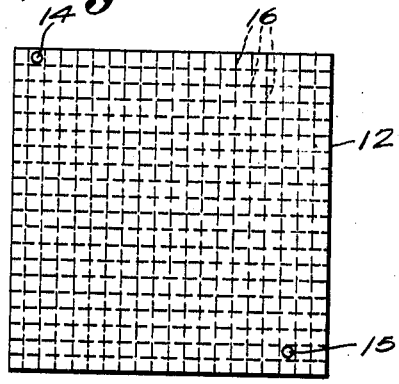
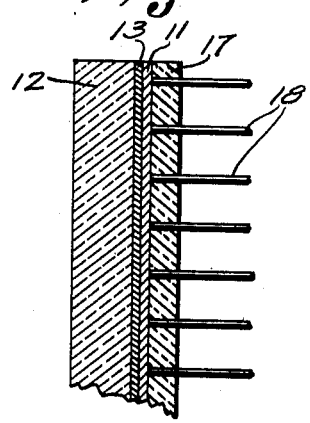
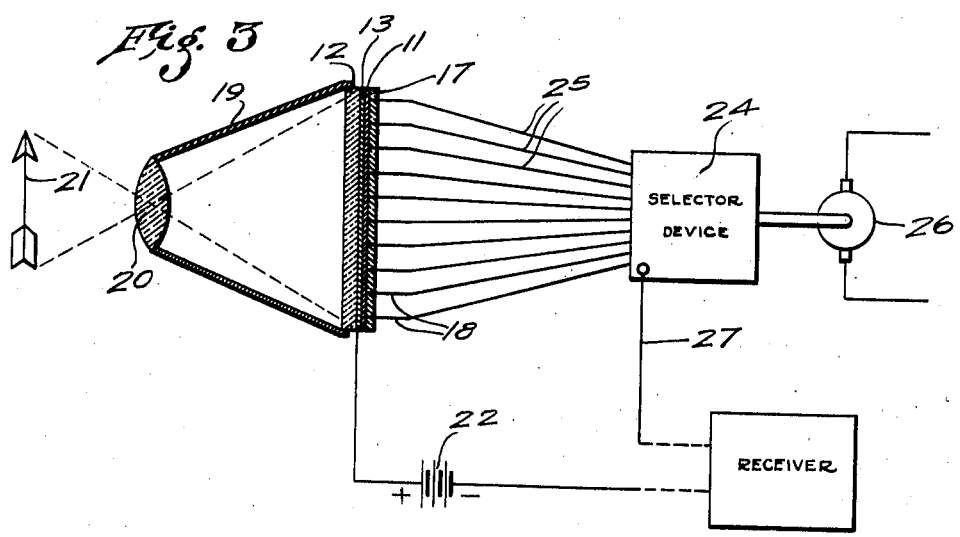
INVENTOR
Thomas W. Sukumlyn
By John Flam
ATTORNEY Patented Oct. 4, 1932

1,880,289

UNITED STATES PATENT OFFICE

THOMAS W. SUKUMLYN, OF LOS ANGELES, CALIFORNIA

LIGHT SENSITIVE DEVICE

Application filed July 21, 1928. Serial No. 294,559.

This invention relates to the use of selenium, and especially to the application of selenium for transmitting the effect of radiant energy, such as light, to a distant point. My device can be used in connection with television, but its field is not confined thereto.

It is known that selenium is sluggish in its action, and is not capable of following intensely rapid light variations; and for this reason it has been quite generally discarded, and instead, other devices utilizing electronic action have been suggested and used. Such devices however, produce very minute effects, so that considerable amplification must be resorted to in order to make the system practical. It is therefore the object of my invention to provide a substitute in such systems of a device that can cause a comparatively large degree of variation in response to light variation, and yet in which the time lag factor is not a detriment.

In my invention, I use a comparatively large expanse of light sensitive material, that is so arranged that light variations at any part of its surface can be transformed into electrical impulses in a simple manner.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a diagrammatic view of a cell that embodies my invention;

Fig. 2 is an enlarged fragmentary section of the cell; and

Fig. 3 is a diagram showing one manner of use of my invention.

Selenium has the property that its resistance varies greatly with the degree of illumination to which it is subjected. As the intensity of illumination increases, the resistance decreases, and vice versa.

Other materials may also have this property; and I intend that the term "selenium" shall include such equivalent materials. I utilize a plate 11 of selenium that can be subjected to light variations, which can be supported as a thin film on a support 12 that is transparent, such as glass. Interposed between the layer 11 of selenium and support 12 is a conducting layer 13 that is capable of passing light; and that forms one electrode of the cell. This layer can be a fine wire mesh, but I preferably use an extremely thin layer of such metal as silver, which can be deposited on the glass 12 in any well-known manner. When made very thin, it is possible to transmit light through it, as it has translucent properties. Layers 11 and 13 can be closely adherent one on top of another. In order to stiffen layer 13, it may be provided with a border, but this may be obviated, as in this instance, where the glass 12 forms a support.

Layer 11 forms another electrode for the system. As light shines through glass 12 and onto a small area 14 (Fig. 1) the resistance of that part of the layer 11 that is immediately at the rear of this area will be affected; and this resistance is substantially independent of the variation in resistance of another small portion of selenium remote from spot 14; say such as spot 15. Thus the selenium layer 11 can be used to record or transmit variations in light intensity at any and all elemental areas such as those defined by the dotted lines 16. The spacing of these dotted lines is greatly exaggerated for the sake of clearness.

In order to insert these elemental portions of selenium into a useful circuit, I may provide a conducting medium that is active selectively with respect to the areas. I show an insulation plate 17, in which are embedded a very large number of conductors 18, one for each elemental area. This plate can be held tight against the selenium layer 11, so that the inner ends of these conductors will contact with the selenium.

The complete cell, as described, can be used for example in a television transmission system. Thus in Fig. 3, I show a box or camera 19 in which is appropriately supported an image forming device such as a lens 20. This can serve to focus the image of an object 21 located in front of the lens onto the layer 11 that is located in the focal plane. As object 21 moves about, the degree of illumination falling on any particular spot on coating 11 will correspondingly vary. This effect can be made use of to transmit in succession, a large number of electrical impulses, one for each elemental spot. Thus the coating 11 can be placed directly in a transmission circuit including a source of electrical energy 22, a distant receiver 23, and a selector device that selects the particular spot on coating 11 that is active to influence the transmission circuit.

In the present instance, for the sake of reducing the diagrammatic showing of such an arrangement to the simplest form, I merely show as an example of such a selector device a large number of metallic conductors 25, each fastened to a conductor 18 in plate 17, and connected at the other end to a commutator or circuit controller 24, driven at any desired speed, for example by a motor 26. The device 24 has a conductor 27 connected thereto in such manner that as the commutator is driven, this conductor is in succession connected to each of the wires 25. In this way, the transmission circuit 11—13—22—23—27—25—17 is energized successively in accordance with the conductivity of a definite spot on layer 11.

If the speed of shifting from one spot to another is sufficiently great, then it is obvious that a complete "scanning" of the image projected on coating 11 can occur so rapidly that when the image is thus reproduced by receiver 23, the effect is that of a reproduction of the continuous motion of image or object 21, due to the rapid succession of images impressed upon the eye of the user of receiver 23. It has been found that as few as ten or fifteen complete scannings per second are sufficient to produce this television effect. It is of course understood that the receiver 23 accurately positions, in synchronism with selector 24, the spots of light on a screen provided therein. Such receivers are now well known, and require no further elucidation, especially since my invention is not directly concerned with the structure of such receivers.

It is of course possible to secure the desired variations in resistance even when the selenium layer 11 is continuous, because as any one of conductors 25 is inserted by selector 24 in the transmission circuit, the resistance of that circuit is obviously determined mainly by the degree of illumination of the coating 11 immediately adjacent the end of this active conductor. However, if finer definition be required, it is of course possible to split up the layer 11 into a large number of insulated areas, such as squares, each area being in turn associated with its respective conductor 25.

The properties of selenium are such that its resistance is not immediately reduced when the illumination thereof ceases. In the present arrangement, this feature makes no difference. The selenium layer 11 is subjected at all times to the light transmitted through lens 20, and it needs to change its resistance only as the image 21 varies. This variation of the image is so gradual that the selenium can readily adjust its resistance thereto between the successive connections of that portion of the selenium in a transmitting circuit. In this way, the resistance of this active portion of the selenium coating is predetermined before its activity in the circuit, and the circuit does not have to wait upon the sluggish readjustments of the selenium. It is easy at the present time, to obtain selenium that can respond to light impulses as fast as ten times per second; and this is all that is required in my system as disclosed.

I claim:

1. In a device of the character described, means forming a translucent conductor, a layer of selenium disposed over the conductor, and means providing substantially uniformly distributed and independent contacts to the exposed face of the selenium.

2. In a device of the character described, means forming a transparent conductor, a layer of light sensitive material disposed over the conductor, and a series of independent contacts cooperating with the exposed face of the material.

3. In a device of the character described, means forming a transparent conductor, a layer of light sensitive material disposed over the conductor, a layer of insulation disposed over the material, and a series of independent contacts extending through the insulation, and cooperating with the material.

4. In a device of the character described, means forming a transparent conductor, a layer of light sensitive material disposed over the conductor, a layer of insulation disposed over the material, and a series of independent contacts extending through the insulation, said contacts forming a closely spaced arrangement so that each contact cooperates with an elemental portion of the whole layer of light sensitive material.

In testimony whereof I have hereunto set my hand.

THOMAS W. SUKUMLYN.